United States Patent [19]

Richards et al.

[11] Patent Number: 5,181,114
[45] Date of Patent: Jan. 19, 1993

[54] INCLUDING BREAK SLOTS IN BROADCAST VIDEO SIGNALS

[75] Inventors: John W. Richards, Stockbridge, England; James B. Pearman, Glendale, Calif.; Terry R. Hurley, Newbury, England

[73] Assignee: Sony Corporation, Tokyo, Japan

[21] Appl. No.: 666,017

[22] Filed: Mar. 7, 1991

[30] Foreign Application Priority Data

Mar. 14, 1990 [GB] United Kingdom ............... 9005756

[51] Int. Cl.⁵ .......................... H04N 7/08; H04N 7/04
[52] U.S. Cl. ................................... 358/146; 358/142; 358/160; 358/310; 358/86; 360/33.1
[58] Field of Search ............... 358/160, 22, 185, 311, 358/142, 146, 86, 310; 360/13, 14.1, 31, 33.1, 57

[56] References Cited

U.S. PATENT DOCUMENTS

| 4,510,535 | 4/1985 | Tokumitsu | 360/14.2 |
| 4,724,491 | 2/1988 | Lambert | 358/10 |
| 4,739,405 | 4/1988 | Sumida | 358/160 |
| 4,891,715 | 1/1990 | Levy | 360/14.1 |
| 5,063,493 | 11/1991 | Shioiri et al. | 364/192 |

FOREIGN PATENT DOCUMENTS 1-191578  8/1989  Japan .

Primary Examiner—James J. Groody
Assistant Examiner—S. Metjahic
Attorney, Agent, or Firm—Alvin Sinderbrand; William S. Frommer

[57] ABSTRACT

In order to include a break slot in a broadcast video signal, the signal is first fed through a RAM recorder having a variable delay. Reading of the signal from the RAM recorder is controlled in such a manner that the delay produced by the RAM recorder is reduced from an accumulated value. After the delay has been reduced by a desired amount, reading out of the signal from the RAM recorder is inhibited until the delay has increased again to no more than the accumulated value, thereby to produce a break slot having a duration no more than the reduction of the delay produced by the RAM recorder. The reduction of the delay produced by the RAM recorder may be brought about by: skipping the reading of unwanted portions of the signal stored in the RAM recorder, by feeding the signal through a fixed delay RAM recorder before feeding it through the variable delay RAM recorder and viewing the signal before it is fed through the fixed delay RAM recorder to identify portions of the signal to be edited out; or by reading from the variable delay RAM recorder at a speed greater than the speed at which the signal is written to the variable delay RAM recorder.

15 Claims, 2 Drawing Sheets

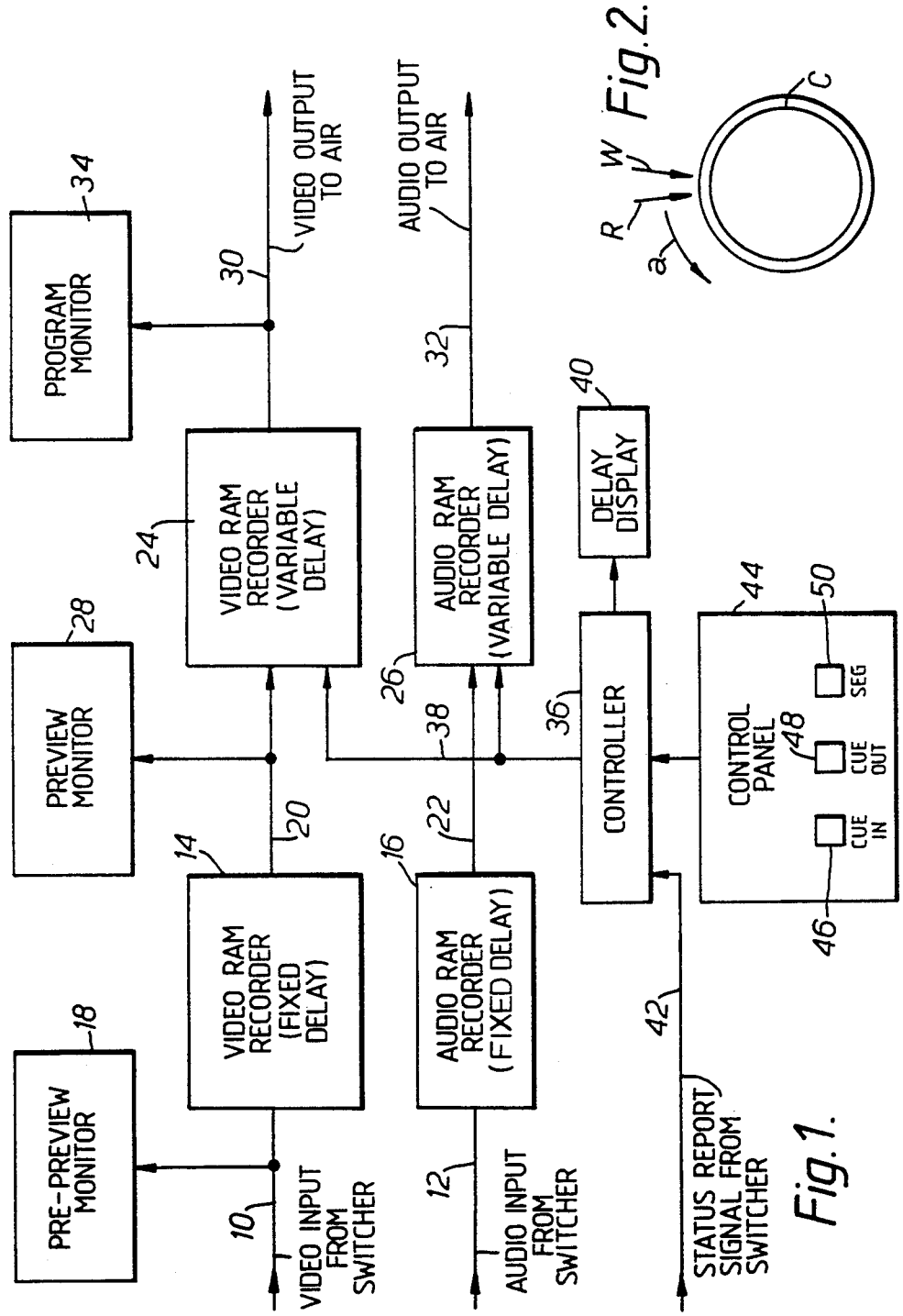

INCLUDING BREAK SLOTS IN BROADCAST VIDEO SIGNALS

BACKGROUND OF THE INVENTION

1. Field of the Invention

This invention relates to the inclusion of break slots in broadcast video signals.

2. Description of the Prior Art

The editing of additional material (for example a commercial break or an expert commentary or summary) into recorded video material presents no problem as regards preserving continuity in the original material. That is to say, it is easy to ensure that the editing operation does not involve the loss of wanted parts of the original material. However, the situation is altogether different in the case of at least some live broadcasts. In the case, for example, of live television transmissions of sporting events, natural breaks of sufficient length usually do not occur with sufficient regularity and/or predictability. To take a more specific example, consider a soccer game. The only predictable break long enough for the transmission to include commercials is at half-time. To include a break during play would involve the risk of an exciting and/or crucial part of the game being missed by the viewers.

An object of the invention is to enable a break slot to be inserted into a broadcast signal in such a manner as to minimize the risk of desired program material thereby not being transmitted.

SUMMARY OF THE INVENTION

The invention provides a method of including a break slot in a broadcast video signal, in which the signal is fed through a RAM recorder having a variable delay, reading of the signal from the variable delay RAM recorder is controlled in such a manner that the delay produced by the RAM recorder is reduced from an accumulated value, and, after the delay produced by the variable delay RAM recorder has been reduced by a desired amount, reading out of the signal from the RAM recorder is inhibited until the delay produced by the RAM recorder has increased again to no more than said accumulated value, thereby to produce a break slot having a duration no more than said reduction of the delay produced by the RAM recorder.

By employing the above method, no desired part of the material to be broadcast need be lost. A transmission can, for example, start by setting the delay of the variable delay RAM recorder to zero and writing the video signal into it until the delay has reached an initial accumulated value. While this is taking place (that is, during an initial break slot), other material, such as commercials, can be transmitted. The material written into the RAM recorder is then read out and transmitted with a total delay equal to the sum of the initial accumulated delay and any other delay (for instance that of a fixed delay RAM recorder mentioned below) that may be produced in the signal processing path. The initial accumulated delay of the variable delay RAM recorder may, for example, be equal to up to about three minutes, whereby the transmission is almost live, being delayed only by a small amount with respect to real time. As transmission carries on, the total delay is reduced as the delay produced by the variable delay RAM recorder is reduced from the initial accumulated value by controlling the reading of the signal from the RAM recorder. After the delay has been reduced by a sufficient amount, for example by up to about three minutes over a period of time equal to about twenty minutes, a further break slot (up to about three minutes in the above example) is available for the transmission of other material, such as commercials, after which transmission of the main material to be broadcast can be resumed at the same point at which it was stopped at the start of the further break slot. This process of creating a further break slot (for example, every 20 minutes or so) may be repeated indefinitely.

In one embodiment of the invention, the signal is fed through a RAM recorder having a fixed delay before it is fed through the variable delay RAM recorder, the signal is viewed prior to its being fed through the fixed delay RAM recorder in order to identify portions of the signal to be edited out, and the step of controlling reading of the signal from the variable delay RAM recorder comprises causing the variable delay RAM recorder to skip reading said identified portions, whereby the delay produced by the variable delay RAM recorder is reduced from said accumulated value by the sum of the durations of said identified portions. The time for the break slot is thus, in this case, accumulated effectively by editing out portions (usually of different lengths) of the material that the operator considers need not be transmitted. The transmission can take place at normal speed.

In another embodiment, the step of controlling reading of the signal from the variable delay RAM recorder comprises causing the signal to be read from the variable delay RAM recorder at a rate greater than the rate at which the signal is written to the variable delay RAM recorder, whereby the delay produced by the variable delay RAM recorder is reduced as time elapses in proportion to the difference between the reading and writing rates. In this case, no material need be edited out. Instead, the time for the break slot is accumulated by transmitting the material at a speed that is greater than its real speed. For instance, pursuing the example given above, the signal can be transmitted at a speed equal to 20/17 times the real speed so as to accumulate time for a break slot of three minutes (by reducing the delay produced by the variable delay RAM recorder from an accumulated value of three minutes to a final value of zero) over a period of twenty minutes. Provided that the ratio of the transmission speed to the real speed is reasonably close to unity, the fact that the transmission is speeded up will hardly be apparent to (or at least not irritating to) the viewer, at least for some types of program material.

For the avoidance of doubt, the expression "broadcast" as used herein covers diffusion of a video signal by any medium, for example by radio broadcasting and/or cable diffusion.

BRIEF DESCRIPTION OF THE DRAWINGS

The above and other objects, features and advantages of the invention will be apparent from the following detailed description of illustrative embodiments, which is to be read in conjunction with the accompanying drawings, in which like references designate like items throughout, and in which:

FIG. 1 is a schematic block diagram of a first apparatus for including break slots in a broadcast video signal;

FIG. 2 is a schematic representation of the manner of operation of RAM recorders forming part of the apparatus of FIG. 1;

DESCRIPTION OF THE PREFERRED EMBODIMENTS

Figure 3:
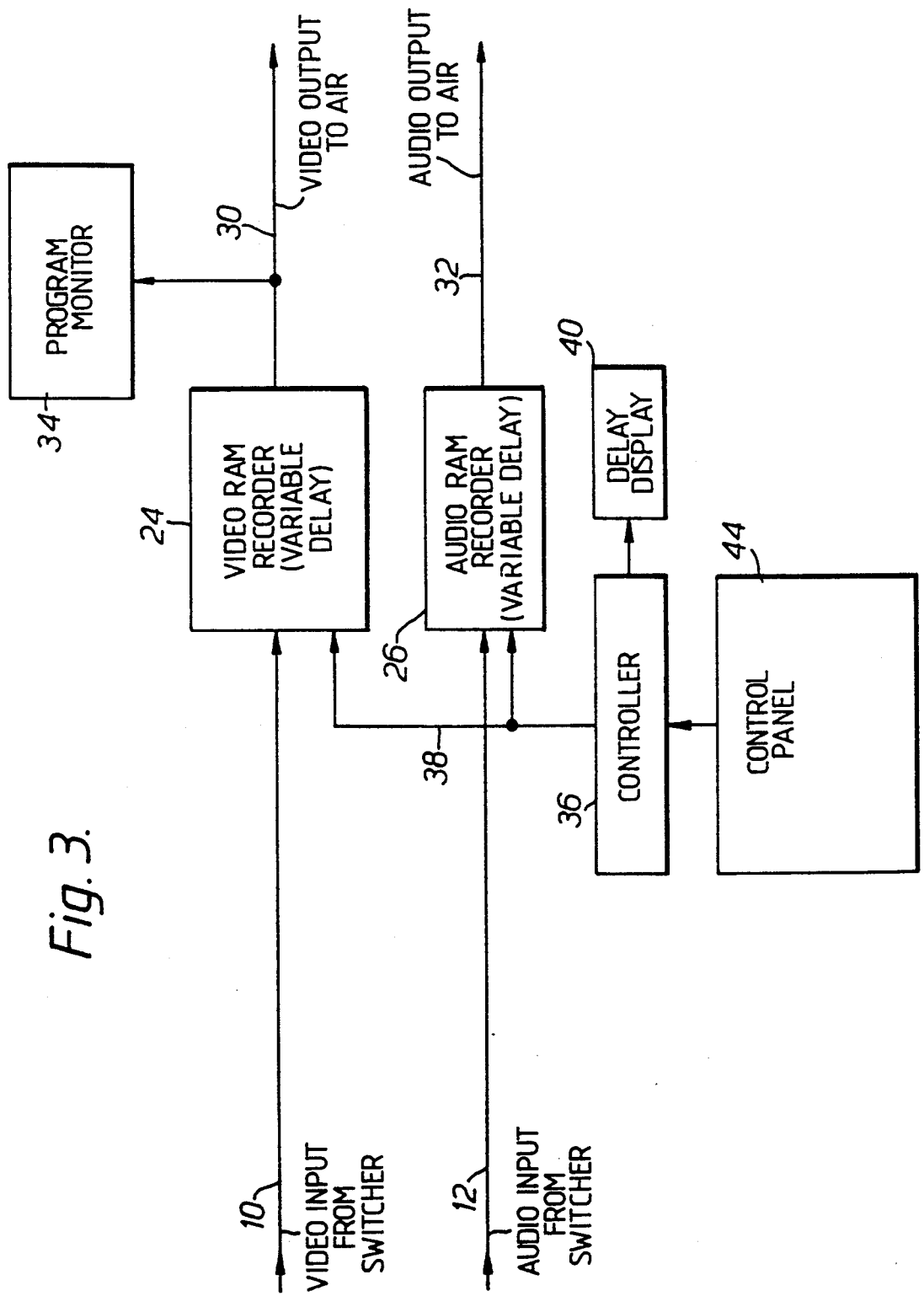
FIG. 3 is a schematic block diagram of a second apparatus for including break slots in a broadcast video signal.

In the apparatus shown in FIG. 1, digital video and audio program signals outputted by a switcher (not shown), for example a switcher provided in an outside broadcast control unit covering a sporting event, are applied via busses 10 and 12 to a fixed delay video RAM (random access memory) recorder 14 and a fixed delay audio RAM recorder 16, respectively. Each of the recorders 14 and 16 has the same fixed delay. If the video RAM recorder 14 is (or is similar to), for example, a Type DEM1000 video RAM recorder as marketed by Sony Corporation, which can produce a delay of up to three minutes in accordance with the amount of RAM therein, the fixed delay of each of the recorders 14 and 16 is selected to be of a value, of no more than the maximum of three minutes available, sufficient to enable editing out (as described below) of the maximum sequence length for which it is anticipated that editing out will be required. Thus, for some applications, the fixed delay of each of the recorders 14 and 16 may be as little as (say) 20 seconds, whereas for others it may be larger. In view of the high cost of RAM at the present time, it is desirable that the fixed delay (and therefore the amount of RAM in the recorders 14 and 16) be as short as possible.

A pre-preview monitor 18 is connected to the bus 10 to enable an operator of the apparatus to view the real time video signal outputted, for transmission, by the switcher.

After having been subjected to the fixed delay in the recorders 14 and 16, the video and audio signals are passed via busses 20 and 22 to a variable delay video RAM recorder 24 and a variable delay audio RAM recorder 26, respectively. The recorders 24 and 26 subject the video and audio signals, respectively, to the same variable delay. If the video RAM recorder 24 is, for example, a Type DEM1000 recorder, the delay of each of the recorders 24 and 26 is advantageously variable between three minutes and zero.

A preview monitor 28 is connected to the bus 20 to enable the operator of the apparatus to view the delay video signal outputted by the RAM recorder 14 before it is further delay by the RAM recorder 24.

After having been subjected to a total delay equal to the sum of the fixed delay in the recorders 14 and 16 and the variable delay in the recorders 24 and 26, the video and audio signals are passed via busses 30 and 32 to be outputted to air, that is for broadcasting or transmission by radio (though cable diffusion could additionally or alternatively be employed.)

A program monitor 34 is connected to the bus 30 to enable the operator of the apparatus to view the video signal outputted to air by the RAM recorder 24.

The apparatus includes a controller 36 connected by a bus 38 to the recorders 24 and 26 to control their operation. The controller 36 can be of a design based upon that conventionally employed to control a Sony DEM1000 video RAM recorder in conventional applications thereof, except that (as described below) it must be able to store information, defining the timing of switching operations, included in an RS422 status report signal, and be able to translate that information into cue in and cue out commands. The controller 36 incorporates (or, as shown, is connected to) a delay display 40 that displays to the operator of the apparatus the value of the variable delay to which the signals are currently being subjected by the variable delay RAM recorders 24 and 26. A bus 42 is connected to the controller 36 to supply thereto the above-mentioned RS422 status report signal, which is outputted in conventional manner by the above-mentioned switcher.

The controller 36 is fitted with a control panel 44 for use by the operator of the apparatus. The control panel 44 has mounted thereon three controls which may, for example, be in the form of pushbuttons, namely a mark cue in button 46, a mark cue out button 48 and a cancel segment button 50.

The operation of the apparatus will be described below. Firstly, however, the construction and operation of the video RAM recorders 14 and 24 will be described. Each of the recorders 14 and 24 is capable of delaying a digital video signal by up to a predetermined amount of time by virtue of the fact that it contains an amount of RAM sufficient to store a commensurate number of fields. Consider for example the case of the Sony DEM1000 type RAM recorder which, when fitted with its maximum amount of RAM, can delay a signal for up to three minutes. A video RAM recorder able to produce a delay of three minutes will have sufficient RAM to store, for example, up to 10800 fields of the signal for a 60 field per second video system, or up to 9000 fields of the signal for a 50 field per second video system. To simplify comprehension of operation, the RAM can be considered to be arranged in a circle C of the appropriate number (for example 10800 or 9000) of addressable field spaces, as shown in FIG. 2 of the drawing. (It will of course be appreciated that, in reality, the physical arrangement of the RAM will not be circular.) At any one time, a write field space address pointer W (shown schematically by an arrow in FIG. 2) determines the field space into which a field of the input signal is being written (recorded) and a read field space address pointer R (shown schematically by an arrow in FIG. 2) determines the field space from which a stored field is being read (played back).

For a fixed delay, the write and read field space address pointers (hereinafter referred to, for brevity, as the write and read pointers) W and R are stepped between the field spaces at the same speed, namely, for a 60 (50) field per second system, at a rate of (60) (50) steps per second. That is to say, pursuing the conceptual illustration shown in FIG. 2, the pointers W and R can be considered to be caused to rotate at the same speed around the circle C of field spaces in a counterclockwise direction, namely in the direction represented by an arrow a. The delay produced by the video RAM recorder is determined by the spacing between the current locations of the write and read pointers W and R and the angular speed of the read pointer R. In the case of FIG. 2, this delay is represented by the angle traversed, in the direction of the arrow a, in moving from the position of the read pointer R to the position of the write pointer W and the angular speed of the read pointer. For the particular positions of the pointers W and R illustrated in FIG. 2, in which the pointers are pointing to two adjacent field spaces, the delay is at a maximum (three minutes) in that each field space is not read (played back) until a full "revolution" (that is, up to 9000 fields) after video data was written into it.

In the fixed delay video RAM recorder 14, the pointers W and R always remain, relative to one another, in the positions shown in FIG. 2, so that a fixed delay, more specifically the above-mentioned selected delay of up to three minutes (up to 10800 or 9000 fields), is always obtained. However, as described below, in the variable delay video RAM recorder 24 the read pointer R (but not the write pointer W) is caused to skip (jump) field spaces, that is to say it is caused to step in increments of more than one field space (in the direction of the arrow a), whereby some of the field spaces are not read (played back) and the delay produced by the recorder (the spacing between the pointers) is reduced.

The audio RAM recorders 16 and 26 may be constructed and may operate in the same way as the video RAM recorders 14 and 24, except that each of the addressable spaces thereof (the selected value of up to 10800 or 9000 in the case of the recorder 16 and the value of 10800 or 9000 in the case of the recorder 26) will store the audio information corresponding to one video field rather than the video information constituting one video field.

The operation of the apparatus will now be described. The object is to provide, once every (say) 20 minutes or so, a break slot of up to three minutes in a live program received by the apparatus from the switcher to enable transmission of, for example, commercials or an expert commentary/summary. The object is achieved, as set forth in more detail below, by first filling up the recorders 24 and 26 so as thereby to define an initial break slot while they are being filled up, and then creating at least one further break slot by using the apparatus effectively to edit out portions (hereinafter also referred to as redundant portions) of the program which it is not desired to transmit, the respective durations of which portions sum to a value equal to or greater than the duration of the break slot.

Initially, the operator commands the controller 36 to cause the write and read pointers W and R for the variable delay RAM recorders 24 and 26 to be relatively positioned (as described above) to produce a zero delay, which value is displayed in the delay display 40, and to cause the write pointers W to advance and the read pointers R to remain stationary ("frozen"). Thus, the program material outputted by the fixed delay RAM recorders 14 and 16 is written into (recorded by) the variable delay RAM recorders 24 and 26, and the material is not read (reproduced) from the recorders 24 and 26. That is, the recorders 24 and 26 start to be filled up with program material. While this is taking place, that is during the initial break slot, commercials or the like can be transmitted. During the initial break slot, the delays produced by the recorders 24 and 26 increase from their initial (zero) values. When the delays reach an accumulated value of not greater than the maximum capacities (three minutes in the present example) of the RAM recorders 24 and 26, by which time the transmission of commercials or the like has ended, the operator commands the controller 36 to unfreeze the read pointers R for the variable delay RAM recorders 24 and 26. The read pointers R thus advance in step with the write pointers W, the spacings between them corresponding to the accumulated delay value of up to three minutes. This value (which remains constant for the time being) is displayed in the delay display 40. The operator then watches the pre-preview monitor 18 with the aim of identifying redundant portions of the program received from the switcher; and makes a physical and/or mental note thereof. Having decided on a portion that can be omitted from the broadcast program, the operator waits for that portion to come up (after the fixed delay produced by the RAM recorders 14 and 16) on the preview monitor 28. At the start of the display of the portion on the preview monitor 28, the operator presses the mark cue in button 46 on the control panel 44, which applies a mark cue in command to the controller 36. The mark cue in command has no effect on the write pointers W. That is, the signals continue to be written in an uninterrupted manner, field by field, into the recorders 24 and 26. However, the controller 36 notes the timing of the mark cue in command (that is, the position in memory of the field at which the button 46 was pressed) and starts to count elapsed fields from the moment that the button 46 was pressed. At the end of the display of the redundant portion on the preview monitor 28, the operator presses the mark cue out button 48, which applies a mark cue out command to the controller 36. The mark cue out command also has no effect on writing of the signals into the recorders 24 and 26. However, on issuance of the mark cue out command, the controller 36 notes the duration (number of fields) of the redundant portion, subtracts this from the current delay of the recorders 24 and 26 and displays the new (reduced) delay on the display 40. Also, knowing the current delay, the controller 36 determines when the read pointer R for each of the recorders 24 and 26 will point to that one of the field spaces located immediately before the first field space in which the redundant portion is recorded (cue in). When, for each of the recorders 24 and 26, the read pointer R points to said one field space, the controller 36 causes the read pointer to skip the redundant portion, that is to jump ahead to the next field space following the redundant portion (cue out). This action has two consequences. First, the redundant portion, though written into the recorders 24 and 26, is not read therefrom and is therefore not transmitted. Second, the delay produced by the recorders 24 and 26 is reduced from its previous value by the duration of the redundant portion.

The foregoing editing operation is repeated, the duration of each redundant portion being subtracted from the previous value of the delay produced by the variable delay RAM recorders 24 and 26. That is, the delay (which can be viewed by the operator on the display 40) produced by the recorders 24 and 26 is reduced by the sum of the durations of successively operator-selected redundant portions. Repetition of the editing operation is stopped when the delay is reduced to near zero, if a three minute break slot is desired, or until it is reduced to some value greater than near zero if a break slot of less than three minutes is desired. When (e.g. twenty minutes after the start of the program or after the previous break slot) it is desired that a bread slot should commence, the controller 36 is responsive to an indication thereof by the operator to "freeze" the read pointers R of the recorders 24 and 26. Thus, the recorders 24 and 26 stop reading out the signals stored therein, but continue to have signals written into them. Thus, the write pointers W start to catch up the read pointers R. That is, the delay produced by the recorders 24 and 26 starts to increase towards the maximum value, at which, for each recorder, the write and read pointers are adjacent to one another, as shown in FIG. 2. The break slot is stopped at or before this point since, if it went on after this point then, in the absence of any preventive measure, the write pointer W would overtake the read pointer R and reduce the delay to zero.

At least one further break slot may then be established by repeating the pre-viewing and editing steps as described above.

It was explained above how redundant (unwanted) program portions could be marked by using the mark cue in and mark cue out buttons 46 and 48 to mark the beginnings and ends of the portions. As will now be described, the apparatus enables redundant portions to be marked in an alternative way.

As the program is being created, the switcher mentioned above is used to switch between different cameras. That is, the program outputted by the switcher comprises successive program segments, of different lengths, each originating from a different camera than the preceding segment and each having its start and end defined by a camera switching operation. As is well known to those skilled in the art, the above-mentioned RS422 status report signal produced by the switcher (applied via the bus 42 to the controller 36) contains information defining the timing of the switching operations and therefore defining the beginning and end of each program segment. Now it may be the case that, when looking at the preview monitor 18, the operator will decide that an entire program segment is unwanted. Should this be the case, the operator can define that segment as being a redundant portion without any need to mark its beginning and end. Instead, all he has to do is to wait for the segment in question to come up on the preview monitor 28 and, when it does, to press the cancel segment button 50 on the control panel 44 to issue a segment cancel command to the controller 36. The controller 36 is (as mentioned above) operative to store the timings of the switching operations contained in the status report signal on the bus 42. When the controller 36 receives a segment cancel command, it treats the previous (stored) switching operation as a mark cue in command and the following switching operation as a mark cue out command whereby the entire segment is treated as a redundant portion just as if it had been marked, as described above, by use of the mark cue in and mark cue out buttons 46 and 48.

FIG. 3 shows a modification of the apparatus described above with reference to FIG. 1. In the apparatus of FIG. 3, break slots are created without editing out portions of the program outputted by the switcher. Therefore, in the modification, the monitors 18 and 28, the fixed delay RAM recorders 14 and 16 and the buttons 46, 48 and 50 are not needed. Instead, the controller 36 is operative to cause the variable delay RAM recorders 24 and 26 to read out (play back) the signals stored therein at a speed which is greater than that at which the signals are written into (recorded in) the recorders 24 and 26. This has the effects that: (i) the transmitted signal is transmitted at a speed that is higher than its original (real) speed; and (ii) starting from its accumulated value of up to three minutes, the delay produced by the recorders 24 and 26 is reduced as time elapses in proportion to the difference between the reading and writing speeds. For example, if the ratio of the reading speed to the writing speed is 20:17, the delay produced by the recorders 24 and 26 will be reduced from three minutes to zero, producing a break slot of three minutes, over a period of twenty minutes. Provided that the ratio of the transmission (reading) speed to the real (writing) speed is reasonably close to unity, the fact that the transmission is speeded up will hardly be apparent to (or at least not irritating to) the viewer, at least for some types of program material.

The invention can, of course, be carried into effect in other manners than those described above by way of example. For instance, whereas in the illustrated arrangements the video and audio output signals from the switcher are processed through respective pairs (14/24 and 16/26) of fixed and variable delay RAM recorders in the case of FIG. 1 or a respective pair (24/26) of variable delay RAM recorders in the case of FIG. 3, if the audio signal were (in a manner known per se) digitally inserted into the video signal, the fixed delay and variable delay audio RAM recorders 16 and 26 would not be needed and could be dispensed with.

Although the above-described embodiments preferably employ Sony Type DEM1000 or similar video RAM recorders, in which the RAM is of semiconductor form, it is to be noted that the expression "RAM" is not to be interpreted as being restricted to random access memory which is wholly in semiconductor or other electronic form. While the recorders must be of a random access form, whereby the use of serial access devices such as tape recorders is precluded, it is believed that RAM recorders having an access arrangement at least partially of a mechanical nature could be employed. For example, it is contemplated that storage of video information could be effected on an erasable video disc. While random access to such a disc is, unlike random access to a semiconductor memory, not substantially instantaneous, it is believed that a RAM recorder with the majority of information recorded on disc, and with a semiconductor type buffer memory interacting with the disc storage to make access substantially instantaneous, might well operate satisfactorily.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of including a break slot in a broadcast video signal, the method comprising:
   storing the signal in a RAM recorder having a variable delay such that the signal is delayed by a first desired amount;
   controllably reading the signal from said variable delay RAM recorder in such a manner that the delay produced by said RAM recorder is reduced from said first desired amount; and
   after the delay produced by said variable delay RAM recorder has been reduced by a second desired amount, inhibiting reading of the signal from said RAM recorder until the signal delay produced by said RAM recorder has increased again to no more than said first desired amount, such that a break slot is thereby produced having a duration no more than said reduction of the delay produced by said RAM recorder.

2. A method
   of including a break slot in a broadcast video signal, the method comprising:
   viewing the signal in order to identify portions of the signal to be edited out;
   after said viewing of signal, feeding the signal through a first RAM recorder having a fixed delay;
   storing the signal from said first RAM recorder in a second RAM recorder having a variable delay such that the signal with said fixed delay is further delayed by a first desired amount;

controllably reading the signal from said second RAM recorder having a variable delay by causing said second RAM recorder to skip reading said identified portions to be edited out, such that the delay produced by said second RAM recorder is reduced from said first desired amount by a second amount proportional to the sum of the durations of said identified portions; and after the delay produced by said second RAM recorder has been reduced by said second amount, inhibiting reading of the signal from said second RAM recorder until the signal delay produced by said second RAM recorder has increased again to no more than said first desired amount, such that a break slot is thereby produced having a duration no more than said second amount by which the delay produced by said second RAM recorder has been reduced.

3. A method according to claim 2, wherein the step of causing said variable delay RAM recorder to skip reading at least one of said identified portions comprises viewing the signal from the fixed delay RAM recorder and generating cue commands at the beginning and end of said at least one of said identified portions which cause said variable delay RAM recorder to skip reading the portion of the signal between said cue commands.

4. A method according to claim 2, wherein:
the step of causing said variable delay RAM recorder to skip reading said identified portions comprises viewing the video signal from said fixed delay RAM recorder and, upon viewing a segment identified by a status report signal and which it is desired to skip, generating a segment cancel command which causes said variable delay RAM recorder to skip reading that segment as identified by said status report signal.

5. A method according to claim 3, wherein:
the step of causing said variable delay RAM recorder to skip reading said identified portions comprises viewing the video signal from said fixed delay RAM recorder and, upon viewing a segment identified by a status report signal and which it is desired to skip, generating a segment cancel command which causes said variable delay RAM recorder to respond to said status report signal as said cue commands such that said RAM recorder skips reading that segment as identified by said status report signal.

6. A method according to claim 1, wherein the step of controllably reading the signal from said RAM recorder comprises reading the signal from said RAM recorder at a rate greater than a rate at which the signal is stored in said RAM recorder, such that the delay produced by said RAM recorder is reduced as time elapses in proportion to the difference between the reading and writing rates.

7. A method according to claim 1, further comprising the step of setting an initial delay of said RAM recorder to zero, and wherein the step of storing the signal in said RAM recorder comprises storing the signal therein without reading the signal therefrom such that an initial break slot is established and the delay produced by said RAM recorder builds up to said first desired amount.

8. A method according to claim 2, further comprising the step of setting an initial delay of the second RAM recorder substantially to zero, and wherein the step of storing the signal in said second RAM recorder comprises storing the signal therein without reading the signal therefrom such that an initial break slot is established and the delay produced by said second RAM recorder builds up to said first desired amount.

9. A method of including a break slot in a broadcast video signal, the method comprising:
viewing the signal to identify portions thereof to be edited out;
feeding the signal through a RAM recorder having a fixed delay;
after the signal has been fed through said fixed delay RAM recorder, storing the signal in a RAM recorder having a variable delay such that the signal is delayed in said RAM recorder by an accumulated value;
controllably reading the signal from the variable delay RAM recorder in such a manner as to skip reading the identified portions, such that the delay produced by said variable delay RAM recorder is reduced from said accumulated value by an amount proportional to the sum of the durations of said identified portions; and
after the delay produced by said variable delay RAM recorder has been reduced by a desired amount, inhibiting reading of the signal from said variable delay RAM recorder until the delay produced by said variable delay RAM recorder has increased again to no more than said accumulated value, thereby to produce a break slot having a duration no more than the reduction of the delay produced by said variable delay RAM recorder.

10. A method according to claim 9, wherein the step of controllably reading the signal from said variable delay RAM recorder in such a manner as to skip reading said identified portions comprises viewing the signal from the fixed delay RAM recorder to identify at least one of said identified portions and generating cue commands at the beginning and end of said at least one of said identified portions which cause said variable delay RAM recorder to skip reading the portion of the signal between said cue commands.

11. A method according to claim 9, wherein:
the step of controllably reading the signal from said variable delay RAM recorder in such a manner as to skip reading said identified portions comprises viewing the video signal from said fixed delay RAM recorder and, upon viewing a segment identified by a status report signal and which it is desired should be edited out, generating a segment cancel command which causes said variable delay RAM recorder to respond to said status report signal by skipping the reading of that segment as identified by said status report signal.

12. A method according to claim 10, wherein:
the step of causing said variable delay RAM recorder to skip reading at least one of said identified portions comprises, upon viewing a segment identified by a status report signal and which it is desired should be edited out, generating a segment cancel command which causes said variable delay RAM recorder to respond to said status report signal as said cue commands by skipping the reading of that segment as identified by said status report signal.

13. A method according to claim 9, further comprising the step of setting an initial delay of the variable delay RAM recorder substantially to zero, and wherein the step of storing the signal in said variable delay RAM recorder comprises storing the signal therein without reading the signal therefrom such that an initial break slot is established and the delay produced by the variable delay RAM recorder builds up to said accumulated value.

14. A method of including a break slot in a broadcast video signal, the method comprising:

storing the signal in a RAM recorder having a variable delay at a predetermined rate such that the signal is delayed by a first desired amount;

controllably reading the signal from the variable delay RAM recorder in such a manner as to cause the signal to be read from said RAM recorder at a reading rate greater than the predetermined rate at which the signal is stored in said RAM recorder, such that the delay produced by said RAM recorder is recorder, such that the delay produced by said RAM recorder is reduced from said first desired amount as time elapses in proportion to the difference between the reading rate and said predetermined rate; and after the delay produced by said variable delay RAM recorder has been reduced by a second desired amount, inhibiting reading of the signal from said RAM recorder until the signal delay produced by said variable delay RAM recorder has increased again to no more than said first desired amount, such that a break slot is thereby produced having a duration no more than said reduction of the delay produced by said variable delay RAM recorder.

15. A method according to claim 14, further comprising the step of setting an initial delay of the variable delay RAM recorder substantially to zero, and wherein the step of storing the signal in said variable delay RAM recorder comprises storing the signal without the signal being read such that an initial break slot is established and the delay produced by the variable delay RAM recorder builds up to said first desired amount.

* * * * *